United States Patent
Ham et al.

(10) Patent No.: US 7,846,864 B2
(45) Date of Patent: Dec. 7, 2010

(54) PHOTOCATALYST MATERIALS HAVING SEMICONDUCTOR CHARACTERISTICS AND METHODS FOR MANUFACTURING AND USING THE SAME

(75) Inventors: Dong Seok Ham, Suwon-si (KR); Son Ki Ihm, Daejeon (KR); Joo Il Park, Daejon (KR); Kwang Min Choi, Suwon-si (KR); Kwang Eun Jeong, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 845 days.

(21) Appl. No.: 11/707,402

(22) Filed: Feb. 16, 2007

(65) Prior Publication Data

US 2007/0193875 A1 Aug. 23, 2007

(30) Foreign Application Priority Data

Feb. 17, 2006 (KR) .................. 10-2006-0015792

(51) Int. Cl.
| | |
|---|---|
| B01J 27/06 | (2006.01) |
| B01J 27/135 | (2006.01) |
| B01J 27/132 | (2006.01) |
| B01J 23/00 | (2006.01) |
| B01J 23/32 | (2006.01) |
| B01J 23/70 | (2006.01) |
| B01J 23/74 | (2006.01) |
| C01G 23/047 | (2006.01) |
| B01D 11/00 | (2006.01) |
| B01D 11/04 | (2006.01) |
| B01D 61/00 | (2006.01) |
| B01D 61/24 | (2006.01) |
| C02F 1/26 | (2006.01) |
| C02F 1/44 | (2006.01) |
| C02F 1/42 | (2006.01) |
| G21F 9/04 | (2006.01) |

(52) U.S. Cl. .................. 502/325; 502/224; 502/227; 502/228; 502/309; 502/310; 502/312; 502/314; 502/316; 502/324; 502/338; 502/349; 502/350; 423/610; 423/611; 423/612; 210/634; 210/644; 210/649; 210/651; 210/652; 210/681; 210/683

(58) Field of Classification Search .................. 502/224, 502/227, 228, 309, 310, 312, 314, 316, 324, 502/338, 349, 350; 423/610–612; 210/634, 210/644, 649, 651, 652, 681, 683
See application file for complete search history.

(56) References Cited

U.S. PATENT DOCUMENTS 3,280,040 A * 10/1966 Jaffe ........................... 502/11

(Continued)

FOREIGN PATENT DOCUMENTS (Continued)

FOREIGN PATENT DOCUMENTS

JP 8-52360 2/1996

(Continued)

OTHER PUBLICATIONS

"Synthesis and Characterization of Rutile TiO2 Nanopowders Doped with Iron Ions," Nadica D. Abazovic et al. Nanoscalse Res Lett (2009) 4:518-525 (pp. 518-525).*

(Continued)

*Primary Examiner*—Patricia L Hailey
(74) *Attorney, Agent, or Firm*—Mills & Onello, LLP

(57) ABSTRACT

New types of photocatalyst materials are disclosed together with methods for preparing and using these materials, as well as air treatment systems incorporating such materials. The photocatalyst materials of this invention consist essentially of very small particles of a first-metal oxide, the first-metal being a metal that exhibits photo-induced semiconductor properties, having ions of a second-metal dispersed throughout its lattice structure, the second-metal being selected from the group of dopant metals. Such photocatalyst materials are prepared by the steps of mixing first-metal and second-metal precursors, removing nonessential ions from the mixture, drying the resulting product, and calcinating the dried product to produce the completed photocatalyst material.

19 Claims, 11 Drawing Sheets

U.S. PATENT DOCUMENTS

| | | | |
|---|---|---|---|
| 4,944,936 A * | 7/1990 | Lawhorne | 423/612 |
| 5,827,339 A | 10/1998 | Nagafune et al. | |
| 5,846,511 A * | 12/1998 | Kim et al. | 423/610 |
| 6,224,884 B1 * | 5/2001 | Remy | 424/401 |
| 6,365,007 B1 | 4/2002 | Willner et al. | |
| 6,627,173 B2 | 9/2003 | Hemme et al. | |
| 7,521,394 B2 * | 4/2009 | Xie et al. | 502/350 |
| 7,601,326 B2 * | 10/2009 | Torardi | 423/608 |
| 2005/0129591 A1 * | 6/2005 | Wei et al. | 422/186 |
| 2006/0024228 A1 * | 2/2006 | Liang et al. | 423/610 |
| 2006/0110316 A1 * | 5/2006 | Torardi | 423/610 |
| 2007/0154561 A1 * | 7/2007 | Takeda et al. | 424/489 |
| 2008/0031832 A1 * | 2/2008 | Wakefield et al. | 424/59 |

FOREIGN PATENT DOCUMENTS

| | | |
|---|---|---|
| KR | 2007-0108122 | * 11/2007 |
| JP | 9-47661 | 2/1997 |
| JP | 09-192496 | * 7/1997 |
| JP | 10-106908 | 4/1998 |
| KR | 1999-0048895 | * 7/1999 |
| KR | 2001-0103164 | * 11/2001 |
| KR | 10-2004-0025176 | 3/2004 |
| KR | 2004-0025176 | * 3/2004 |
| KR | 2004-0105086 | * 12/2004 |
| KR | 10-2005-0075927 | 7/2005 |
| KR | 2005-0075927 | * 7/2005 |

OTHER PUBLICATIONS

"Preparation and photoactivity of nanostructured TiO2 particles obtained by hydrolysis of TiCl4," Maurizio Addamo et al. Colloids and Surfaces A: Physicochem. Eng. Aspects 265 (2005), pp. 23-31.*

"The effect of iron doping on the adsorption of methanol on TiO2 probed by sum frequency generation," Nkengafeh Asong et al. Chemical Physics 339 (2007), pp. 86-93.*

"Photocatalytic behaviour of metal-loaded TiO2 aqueous dispersions and films," M. Bellardita et al. Chemical Physics 339 (2007), pp. 94-103.*

"Preparation and Characterization of Quantum-Size Titanium Dioxide," Claudius Kormann, et al. J. Phys. Chem. 1988, 92, pp. 5196-5201.*

"Photocatalytic properties of iron-doped titania semiconductors," M. I. Litter et al. Journal of Photochemistry and Photobiology A: Chemistry 98 (1996), pp. 171-181.*

"Preparation and characterization of TiO2/Fe2O3 binary mixed oxides and its photocatalytic properties," Bonamali Pal et al. Materials Chemistry and Physics 59 (1999), pp. 254-261.*

"A comparative study of nanometer sized Fe(III)-doped TiO2 photocatalysts: synthesis, characterization and activity," Chuan-yi Wang et al. Journal of Materials Chemistry, 2003, 13, pp. 2322-2329.*

Linsebigler, et al., Photocatalysis on TiO2 Surfaces: Principles, Mechanisms, and Selected Results, Chemical Reviews, 1995, pp. 735-758, vol. 95, No. 3, American Chemical Soc.

* cited by examiner

PHOTOCATALYST MATERIALS HAVING SEMICONDUCTOR CHARACTERISTICS AND METHODS FOR MANUFACTURING AND USING THE SAME

CROSS-REFERENCE TO RELATED APPLICATIONS

This U.S. non-provisional patent application claims priority under 35 U.S.C. §119 of Korean Patent Application 10-2006-0015792 filed on Feb. 17, 2006, the entire contents of which are hereby incorporated by reference.

BACKGROUND OF THE INVENTION

The subject matter described herein is generally concerned with air purification technology that employs new and improved photocatalyst materials especially efficient in decomposing volatile organic compounds that may be present in an air stream, with methods for manufacturing such photocatalyst materials, and with methods and apparatus for using such materials to clean and purify air streams. A specific application for the photocatalyst materials of this invention is to treat an air stream drawn from a "clean room" environment to remove and/or decompose organic contaminants before recycling the treated air stream back to the "clean room."

It is known in the art of air purification to prepare photocatalytic materials based on metals or metal oxides having semiconductor-like characteristics for removing contaminants from air. For example, the metals titanium (Ti), zirconium (Zr), tin (Sn), zinc (Zn), and similar metals, and the oxides of these metals, e.g., $TiO_2$, $ZrO_2$, $SnO_2$, and $ZnO_2$, are known to demonstrate the semiconductor characteristic of exhibiting at least two possible energy levels which may be referred to as a valence band state and a conduction band state. Thus, when excited or activated by light energy of a suitable wavelength, these materials respond by exciting electrons into the conduction band and leaving electron "holes" in the valence band. Depending on the photocatalytic material, solar light, fluorescent light, ultraviolet light, or other forms of light irradiation may be used effectively to activate the photocatalytic material.

The field known as heterogeneous photocatalysis has attracted considerable attention in recent years. A comprehensive overview of heterogeneous photocatalysis using titanium dioxide ($TiO_2$) appears in a 1995 *Chemical Reviews* article by A. L. Linsebigler et al. entitled "Photocatalysis on $TiO_2$ Surfaces: Principles, Mechanisms, and Selected Results," which article is incorporated herein by reference. This article discusses the potential application of $TiO_2$-based photocatalysts to destroying organic compounds found in polluted air and wastewaters.

The above-cited article provides the following useful summary of how photocatalysis operates to decompose a contaminant such as an organic compound: "In a heterogeneous photocatalysis system, photo-induced molecular transformations or reactions take place at the surface of a catalyst.... The initial excitation of the system is followed by subsequent electron transfer and/or energy transfer. It is the subsequent deexcitation processes (via electron transfer or energy transfer) that leads to chemical reactions in the heterogeneous photocatalysis process.... Photocatalysis processes involve the initial absorption of photons by a molecule or the substrate to produce highly reactive electronically excited states. The efficiency of the photoinduced chemistry is controlled by the system's light absorption characteristics."

When the photocatalytic material is activated by light energy, the electrons generated tend to form "super oxide" anions (typically represented as $O_2^-$) and the holes form hydroxide ($OH^-$) radicals, with the result that the activated photocatalyst has an unusually strong oxidation capability. Specifically, the $O_2^-$ and $OH^-$ radicals are capable of rapidly and effectively oxidizing an organic contaminant contacted at the surface of the photocatalyst thereby converting the contaminant into water ($H_2O$) and carbon dioxide ($CO_2$) or, sometimes, to small amounts of relatively harmless mineral acids, for example HCl. Thus, volatile organic contaminants in an air stream can be effectively decomposed and removed from the environment by contacting the air stream with the light-activated photocatalyst.

The phenomenon known as "band-gap photoexcitation" is described in more technical terms in the previously cited *Chemical Reviews* article as follows:

"Unlike metals which have a continuum of electronic states, semiconductors possess a void energy region where no energy levels are available to promote recombination of an electron and hole produced by photoactivation in the solid. The void region which extends from the top of the filled valence band to the bottom of the vacant conduction band is called the band gap. Once excitation occurs across the band gap there is a sufficient lifetime, in the nanosecond regime, for the created electron-hole pair to undergo charge transfer to adsorbed species on the semiconductor surface from solution or gas phase contact. If the semiconductor remains intact and the charge transfer to the adsorbed species is continuous and exothermic the process is termed heterogeneous photocatalysis."

The *Chemical Reviews* article then further explains how one of the deexcitation pathways for the electrons and holes is a photoinduced chemical reaction at the semiconductor surface:

"The photoinduced electron transfer to adsorbed organic or inorganic species or to the solvent results from migration of electrons and holes to the semiconductor surface. The electron transfer process is more efficient if the species are preadsorbed on the surface. While at the surface the semiconductor can donate electrons to reduce an electron acceptor (usually oxygen in an aerated solution) (pathway C); in turn, a hole can migrate to the surface where an electron from a donor species can combine with the surface hole oxidizing the donor species (pathway D)."

As also taught in the art, however, the electrons and holes generated by exciting a photocatalyst with light energy have a tendency to quickly recombine thereby neutralizing the powerful oxidation capacity of the activated photocatalyst. Thus, the *Chemical Reviews* article further teaches that: "In competition with charge transfer to adsorbed species is electron and hole recombination." Photocatalytic efficiency is therefore generally improved if the photocatalyst can be prepared so as to remain in an excited state (with "free" electrons and holes) for a longer period of time to preserve the high oxidation capability of the material.

An increase in the oxidation capability of a photocatalyst can therefore be achieved by decreasing the rate at which recombination of electrons and holes occurs. This effect can sometimes be achieved by doping a photocatalyst with a relatively small amount of a suitable dopant or dopants, for example with a noble metal. For example, a suitable dopant molecule in a photocatalyst can act as an electron trap site to, at least temporarily, bind a free electron and thereby slow its tendency to recombine with a hole. Similarly, a suitable dopant molecule in a photocatalyst can act as a hole trap site to, at least temporarily, block a hole and thereby slow its tendency to recombine with an electron.

Another means of improving the photocatalytic efficiency of a particular photocatalyst is by increasing the band-gap energy of the photocatalyst. This effect can also sometimes be achieved by doping a photocatalyst with a relatively small amount of a suitable dopant or dopants.

Thus, it is known in the art to improve the photocatalytic efficiency of a metal oxide photocatalyst by doping it with a noble metal. For example, a metal oxide photocatalyst based on Ti, Zr, Sn, Zn, or a similar metal, typically made from a metal alkoxide precursor, can be advantageously doped with a noble metal such as platinum (Pt), gold (Au) or silver (Ag) to provide trap sites in the photocatalyst. Metal alkoxides suitable as precursors in forming these photocatalysts typically have the general chemical formula [M-O-alkyl] in which M is a suitable metal, O is oxygen, and the alkyl group is selected from methyl, ethyl, and similar alkyl groups typically having 6 or fewer carbon atoms.

In a typical application of this preparation process, a noble metal precursor, such as a solution or dispersion of a noble metal in a suitable solvent or dispersant, is prepared. The metal oxide photocatalyst is then doped with the noble metal by any of several familiar methods such as a dipping method, a deposition method, a co-precipitation method, an impregnation method, or a Sol-gel method. In the typical dipping method, the metal oxide photocatalyst is briefly immersed in a bath of the noble metal precursor and then withdrawn. Particles of the noble metal become deposited on and/or within the photocatalyst as the solvent or dispersant evaporates and/or drips off the photocatalyst. The dipping procedure may have to be repeated multiple times to achieve effective doping of the photocatalyst. By comparison with the dipping method, however, the Sol-gel doping method tends to be a very complicated and lengthy (slow) process.

This prior art technique, however, suffers from numerous limitations, drawbacks and disadvantages. One important drawback of the prior art approach is the high costs of the materials. Nobel metals such as Pt, Au, and Ag are also precious metals, which are very expensive. Even the metal alkoxide precursors are relatively expensive industrial commodities. A second disadvantage of the prior art technique is that it is relatively complicated—involving preparation of two precursors—and relatively lengthy.

Another important limitation of the above-described conventional method, however, is that it is very difficult, if not impossible, to reliably prepare nano-sized metal oxide particles for use as the photocatalyst using the metal alkoxide precursor technique. It has been found that the particle size of the photocatalyst is highly inversely correlated with photocatalytic efficiency. Specifically, it has been found that smaller photocatalytic particle size is associated with greater efficiency in decomposing contaminants, presumably because smaller particle size correlates with greater surface area and therefore with a larger active contact area between the photocatalyst and an air stream being treated.

More recent developments in photocatalyst technology have used $TiO_2$ doped with various dopants to prepare useful photocatalyst materials. U.S. Pat. No. 6,627,173, which is incorporated herein by reference, for example, teaches a process for preparing doped, pyrogenically prepared titanium dioxide, doped with zinc oxide, platinum oxide, magnesium oxide or aluminum oxide for use as a photocatalyst or UV absorber. In this patent, the titanium dioxide is doped by injecting an aerosol of the oxide into the production stream. This process, however, requires relatively complex production equipment, does not insure a thorough, homogeneous doping of the $TiO_2$, and does not produce optimally-sized photocatalyst particles.

U.S. Pat. No. 6,365,007, which is also incorporated herein by reference, teaches preparation of a photocatalyst consisting of $TiO_2$ doped with at least one lanthanide metal oxide. The photocatalyst is prepared by forming a titanium-containing gel followed by the steps of drying the gel and subjecting it to calcinations. This process, however, employs relatively uncommon and expensive "inner-transition" lanthanide series elements and relatively high processing temperatures in both the drying and calcination steps.

These and other problems with and limitations of the prior art approaches in this field are addressed in whole or at least in part by the products, methods and apparatus of this invention.

OBJECTS OF THE INVENTION

Accordingly, a general object of this invention is to provide new and improved photocatalyst materials useful in decomposing/removing organic contaminants from a fluid stream.

Another general object of this invention is to provide methods for preparing such new photocatalyst materials.

Another general object of this invention is to provide methods and apparatus for using such new photocatalyst materials to treat fluid streams to decompose/remove contaminants.

A principal object of this invention is to provide relatively inexpensive photocatalyst materials having a high level of photocatalytic efficiency in treating air or other fluid streams to remove/decompose organic contaminants in the fluid stream without the presence of a noble metal, methods of preparing such photocatalytic materials, and methods and apparatus for using these materials.

A specific object of this invention is to provide photocatalyst materials comprising a first-metal oxide, said first-metal having photo-induced semiconductor-like characteristics, with an effective amount of ions of a second-metal being dispersed throughout the first-metal oxide to provide doping characteristics, said second-metal being a dopant.

Another specific object of this invention is to provide methods of preparing photocatalyst materials comprising at least a step of mixing a first-metal precursor, comprising an inorganic chloride of a first-metal selected from a group of metals having photo-induced semiconductor-like characteristics, with a second-metal precursor comprising an inorganic chloride of a second-metal selected from a group of dopants.

Still another specific object of this invention is to provide methods of preparing photocatalyst materials comprising the sequential steps of mixing first-metal and second-metal precursors, removing unessential ions from the precursor mixture, drying the treated mixture, and calcinating the dried mixture.

Yet another specific object of this invention is to provide air purification methods for using photocatalyst materials according to this invention for treating air streams to decompose/remove organic contaminants present in the air streams.

Still a further specific object of this invention is to provide air purification apparatus using photocatalyst materials according to this invention for treating air streams to decompose/remove organic contaminants present in the air streams.

These and other objects and advantages of this invention will be more fully explained in the following portions of this application.

SUMMARY OF THE INVENTION

One aspect of the present invention is directed to new photocatalyst materials having a high photocatalytic efficiency in decomposing organic contaminants. Photocatalytic materials in accordance with this invention consist essentially of an oxide of a first-metal having photo-induced semiconductor-like characteristics doped with an effective dopant amount of a second-metal selected from a group of dopants. As used herein, the term "metal having photo-induced semiconductor-like characteristics" is used to mean a metal that possesses a void energy region where no energy levels are available to promote recombination of an electron and hole produced by photoactivation in the solid, as defined in the previously cited *Chemical Reviews* article. Also, as used herein, the term "dopant" is used to mean a metal that functions as a dopant and has a full continuum of electronic states, as defined in the previously cited *Chemical Reviews* article. Carbon is specifically excluded from both the "metal having photo-induced semiconductor-like characteristics" as used herein and also from the "dopant" as used herein.

As a result of the precursor materials utilized to provide the first-metal and the second-metal, and also as a result of the sequential series of method steps used to prepare the photocatalyst material from the precursor materials, the photocatalyst materials according to this invention are comprised substantially completely of quantum- (nano-) sized particles having a mean particle diameter of about 10 nm or less. Such nano-sized photocatalyst particles significantly increase the efficiency and effectiveness of the photocatalyst material in decomposing volatile organic compounds by dramatically increasing the surface/contact area between the photocatalyst and an air stream containing the volatile organic compounds. Although the previously cited *Chemical Reviews* article teaches the general concept that doping a $TiO_2$ photocatalyst with a transition metal such as iron ($Fe^{+3}$) or copper ($Cu^{+2}$) can improve trapping of electrons to inhibit electron-hole recombination during illumination, this art does not teach the preparation method of this invention.

The first-metal precursor in accordance with this invention can be represented by the general chemical formula $M^1_xCl_y$ in which: $M^1$ (the first-metal) is a non-carbon metal having photo-induced semiconductor-like characteristics, preferably selected from the group consisting of titanium (Ti), zirconium (Zr), tin (Sn), zinc (Zn), and alloys or mixtures thereof; Cl is chloride ion; and x and y are positive integers typically ranging from 1 to about 6. Specific examples of the first-metal precursor include $TiCl_4$, $ZrCl_2$, $SnCl_4$, and $ZnCl_2$. Because carbon is regarded as a contaminant for purposes of this invention, the definition herein of $M^1$ specifically excludes carbon even if it might otherwise be regarded as a "semiconductor metal."

The second-metal precursor in accordance with this invention can be represented by the general chemical formula $M^2_xCl_y$ in which: $M^2$ (the second-metal) is a non-carbon dopant, preferably selected from the group consisting of iron (Fe), tungsten (W), manganese (Mn), vanadium (V), and alloys and mixtures thereof; Cl is chloride ion; and x and y are positive integers typically ranging from 1 to about 6. Specific examples of the second metal precursor include $FeCl_2$, $FeCl_3$ or $Fe_2Cl_6$, $MnCl_2$, $MnCl_3$, $WCl_2$, $WCl_4$, $WCl_5$, $WCl_6$, $VCl_2$, $VCl_3$ and $VCl_4$. Because carbon is regarded as a contaminant for purposes of this invention, the definition herein of $M^2$ specifically excludes carbon even if it might otherwise be regarded as a "dopant."

In the photocatalysts of this invention, it has been found that the second-metal component plays a role similar to that served by the much more expensive noble metal dopants of the prior art photocatalysts as described above. In particular, the second-metal component provides a trap site for free electrons and electron holes thereby slowing the tendency for recombination and helping to preserve a high oxidation capability for the light-activated photocatalyst. Photocatalysts prepared in accordance with this invention will thus contain an effective proportion of the second-metal relative to the first-metal, the amount being effective to serve a dopant function of trapping electrons and holes to measurably slow recombination as compared with an undoped photocatalyst. In a preferred invention embodiment, that effective proportion of second-metal relative to first-metal will range from about 0.1 to about 10 mol %.

A second aspect of this invention is a method for preparing the photocatalyst materials such that the final product is comprised substantially completely of particles having a 10 nm or less mean particle diameter, as described above. The method comprises four sequential steps: (1) mixing the first-metal precursor with the second-metal precursor in the proper proportions of second-metal to first-metal; (2) removing the unessential/unnecessary ion(s) from the precursor mixture to form a sol, gel or powder of a preliminary product; (3) drying the preliminary product resulting from step (2) under particular temperature and pressure conditions to obtain a dried product comprising particles substantially all of which have a mean particle diameter of about 10 nm or less; and (4) subjecting the dried product particles to a calcinations (heat treatment) under controlled temperature and time conditions to produce a final photocatalyst product.

It has been found that the step of removing the unessential/unnecessary ions (typically chloride ions) from the precursor mixture according to this invention results in the formation of an oxide of the first-metal with ions of the second-metal dispersed throughout the lattice structure of the first-metal oxide. This constitutes a "preliminary product" which needs to be dried and calcinated in accordance with the invention method to produce a final photocatalyst material.

A third aspect of this invention is an air purification method and associated air purification apparatus that use a photocatalyst material according to this invention to decompose/remove organic contaminants from an air stream.

These several aspects and embodiments of this invention will be better understood from the following detailed Description and the accompanying drawings/figures as described below.

DETAILED DESCRIPTION OF PREFERRED EMBODIMENTS

Figure 1:
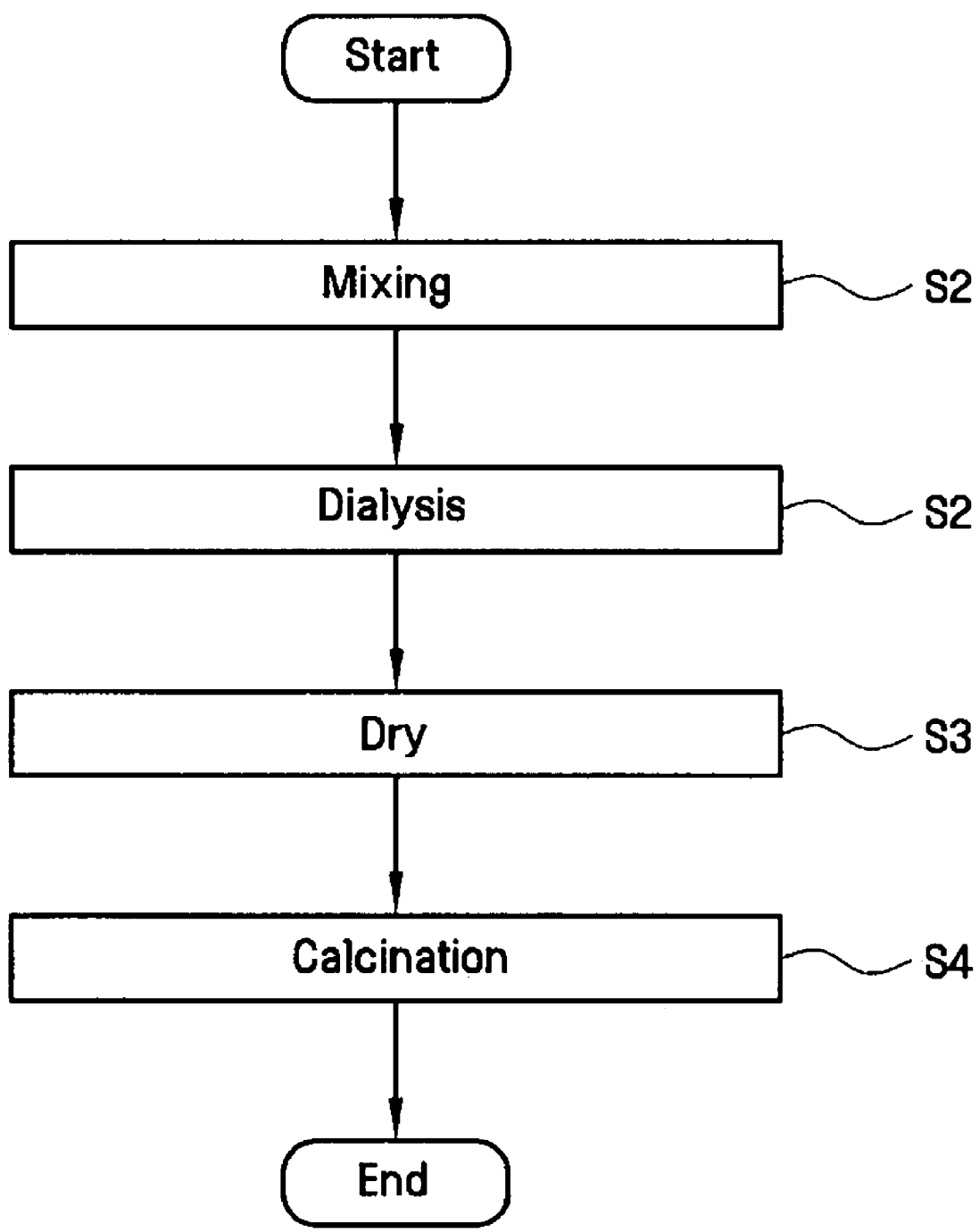
FIG. 1 is a schematic process flow diagram illustrating a sequence of method steps for preparing photocatalyst materials in accordance with this invention.

Photocatalysts according to the present invention are prepared by a four-step method as schematically illustrated in FIG. 1. Only photocatalysts prepared according to the steps shown in FIG. 1 have been found to have all of the advantageous properties described herein, particularly the property of a high photocatalytic efficiency.

Such a high photocatalytic efficiency, at least in significant part, results from producing photocatalyst comprised substantially completely of nano-sized particles having a mean particle diameter of about 10 nm or less. Accordingly, a material having substantially the same chemical composition as a photocatalyst of this invention, but prepared by a different method of preparation than that illustrated in FIG. 1, would not be expected to demonstrate all of the advantageous physical and chemical properties as the photocatalysts of this invention.

As illustrated in FIG. 1, the first step (S1) of the method of this invention is a mixing step wherein a first-metal precursor is mixed with a second-metal precursor, said first-metal and second-metal precursors being selected from the groups of compounds as previously described. In a representative embodiment of carrying out the S1 mixing step, a measured molar quantity of the second-metal precursor may be dissolved in a suitable solvent (e.g., water, hydrochloric acid, acetone, ether, or ethanol), preferably at a relatively low temperature of about 0 to 1° C., to form a solution of the second-metal precursor. Then, a suitable measured molar quantity of the first-metal precursor, for example in powdered form, may be added to the solution until the molar concentration of the second-metal relative to the first-metal is in a range of about 0.1 to 10 mol %. Although a particular mixing step embodiment was described above for illustrative purposes, it will be understood by those skilled in this art that other substantially equivalent approaches to thoroughly and intimately mixing the first-metal and second-metal precursors in suitable proportions may also be effectively employed in this step, and all such substantially equivalent alternative mixing methods are intended to be included within the scope of the S1 mixing step.

The second step (S2) of the method of this invention is a dialysis or ion removal step wherein the unnecessary ion or ions, typically chloride ion ($Cl^-$), is extracted from the mixture of first-metal and second-metal precursors. In an exemplary embodiment of carrying out the S2 dialysis/ion removal step, the mixture from step S1 is placed in a contained fabricated at least in part from a semi-permeable membrane that is permeable to chloride ion but impermeable to the first-metal and the second-metal, and the membrane container is then floated in a surrounding water bath for a suitable length of time (e.g., about one hour). During this period, chloride ion is drawn out of the precursor mixture, passes through the semi-permeable membrane, and is dispersed into the water bath creating a dilute chloride ion solution. The water bath may contain a material that binds with the chloride ions extracted from the precursor solution.

Such a dialysis/ion removal step can be carried out effectively at about room temperature. If this step is permitted to run for about one hour, or perhaps a bit longer, a sol or gel or powder consisting essentially of an oxide of the first-metal containing ions of the second-metal in the desired proportions is typically formed in the membrane container. If the dialysis/ion removal step is not run for a sufficient length of time, however, the maximum sol yield may not be obtained because of interference caused by remaining chloride ions. Although a particular dialysis/ion removal step embodiment was described above for illustrative purposes, it will be understood by those skilled in this art that other substantially equivalent approaches to extracting the unnecessary ion(s) from the mixture of the first-metal and second-metal precursors may also be effectively employed in this step, and all such substantially equivalent alternative ion removal methods are intended to be included within the scope of the S2 dialysis/ion removal step.

The third step (S3) of the method of this invention is a drying step for drying the preliminary product in the form of the sol, gel or powder produced by the S2 dialysis/ion removal step. In a preferred embodiment, the S3 drying step is a vacuum drying step carried out under at least partial vacuum conditions at a pressure of about $10^{-3}$ to about $10^{-4}$ torr and at a generally ambient temperature of about 20° C. to obtain the desired quantum- (nano-) sized photocatalyst particles. As discussed above, it is preferred to produce photocatalyst particles according to this invention wherein substantially all of the particles are nano-sized particles because such nano-sized particles increase photocatalytic activity by increasing the ability of the photocatalyst to adsorb volatile organic compound due to the increased surface area of the photocatalyst. Specifically, in a preferred invention embodiment, the product produced by the S3 drying step consists of particles having a mean particle diameter of about 10 nm or less.

Although a particular drying step embodiment was described above for illustrative purposes, it will be understood by those skilled in this art that other substantially equivalent approaches to drying the sol, gel or powder product from step S2 may also be effectively employed in this step, and all such substantially equivalent alternative drying methods are intended to be included within the scope of the S3 drying step.

The fourth step (S4) of the method of this invention is a calcination or heat treatment step. This step has been found to serve multiple purposes in completing the preparation of photocatalysts in accordance with this invention. First, the S4 calcination step helps to remove residual contaminants that may be present in the dried product of step S3 as a result of earlier processing steps. The presence of such contaminants can impair the photocatalytic activity of the photocatalyst. In addition, it has been found that the S4 calcination step induces a degree of crystal growth of the anatase state of the photocatalyst. It has been found that the anatase state of the photocatalysts of this invention generally has the highest degree of photoactivity leading to greater photocatalytic efficiency. On the other hand, it has also been found that carrying out step S4 at too high a temperature and/or for too long a period of time can lead to a deterioration in the properties of the photocatalyst. Accordingly, a balance needs to be found in carrying out the S4 calcination step to optimize the effectiveness of this step in improving the photocatalyst properties.

In general, the S4 calcination step may be effectively carried out at temperatures ranging from about 50° C. to about 600° C. for a period of about 3 to about 5 hours. In a preferred embodiment, the S4 calcination step is carried out at a temperature between about 100° C. and about 500° C., and in an even more preferred embodiment between about 300° C. to 500° C. It has been found that a calcinations step temperature below about 50° C. generally is not effective in driving off contaminants from the photocatalyst. It has also been found that a calcinations step temperature above about 600° C. results in converting a significant portion of the photocatalyst from the desired anatase state to an undesired rutile state. This results in a loss of photocatalytic efficiency caused by a decrease in both surface area and pore volume which results from partial sintering of the photocatalyst particles.

Within the broad time and temperature ranges stated above, the S4 calcination step may be carried out under varying time/temperature conditions so as to optimize the desirable properties of the resulting photocatalyst product.

The above-described method of production results in a photocatalyst material consisting essentially of an oxide of the first-metal with ions of the second-metal dispersed throughout the lattice structure of the first-metal oxide. The ions of the second-metal act effectively as trap sites for the electrons and holes that are formed when the photocatalyst is exposed to light energy. As a result, recombination of the conduction band electrons and the valence band holes is significantly slowed, and the light-activated photocatalyst maintains its high oxidation capability for a longer period of time. Furthermore, because the photocatalysts of this invention are formed as nano-sized particles, the photocatalytic efficiency of these materials in decomposing volatile organic contaminants is greatly enhanced.

Example 1

This illustrative example demonstrates the preparation of a first photocatalyst in accordance with this invention. The completed first photocatalyst consists essentially of titanium dioxide ($TiO_2$) with interstitial iron (Fe) ions dispersed through the $TiO_2$ lattice.

Four aqueous solutions of iron chloride ($FeCl_2$) in distilled water were prepared as follows:
Example 1a: 0.1 mol % $FeCl_2$
Example 1b: 0.5 mol % $FeCl_2$
Example 1c: 1 mol % $FeCl_2$
Example 1d: 10 mol % $FeCl_2$ Titanium chloride ($TiCl_4$) was mixed into each of the four iron chloride solutions (step S1) and allowed to mix for a period of about 1 hour. Next, the S2 dialysis step was performed on each of the four mixtures for a period of about 1 hour in order to form sols. Next, the S3 vacuum drying step was performed on each of the four sols at a pressure of about $10^{-3}$ to about $10^{-4}$ torr and at a temperature of about 10° C. to about 20° C.

The resulting four photocatalyst products were each divided into four portions (sixteen portions in all). Each portion was then subjected to the S4 calcination step. One portion of each of the four photocatalyst products was subjected to a calcination step at a temperature of 30° C. (essentially no calcination); a second portion of each product was calcinated at 100° C.; a third portion of each product was calcinated at 300° C.; and, the fourth portion of each product was calcinated at 500° C. These sixteen completed photocatalyst products were used to carry out subsequent experimental testing as described below.

Example 2

This illustrative example demonstrates the preparation of a second photocatalyst in accordance with this invention. The completed second photocatalyst consists essentially of titanium dioxide ($TiO_2$) with interstitial tungsten (W) ions dispersed throughout the $TiO_2$ lattice. This example was carried out in the same manner as described above for Example 1 except that four aqueous solutions of tungsten chloride ($WCl_2$) were substituted for the aqueous solutions of iron chloride. These sixteen completed photocatalyst products were used to carry out subsequent experimental testing as described below.

Example 3

This example illustrates the relationship between mean particle size of the photocatalyst and the concentration of the second metal ion under conditions of different calcinations step temperatures. In these tests, particle sizes were measured using a dynamic light scattering method. The results of this experimental testing are illustrated in FIGS. 3A to 3D, as described below.

Figure 3A:
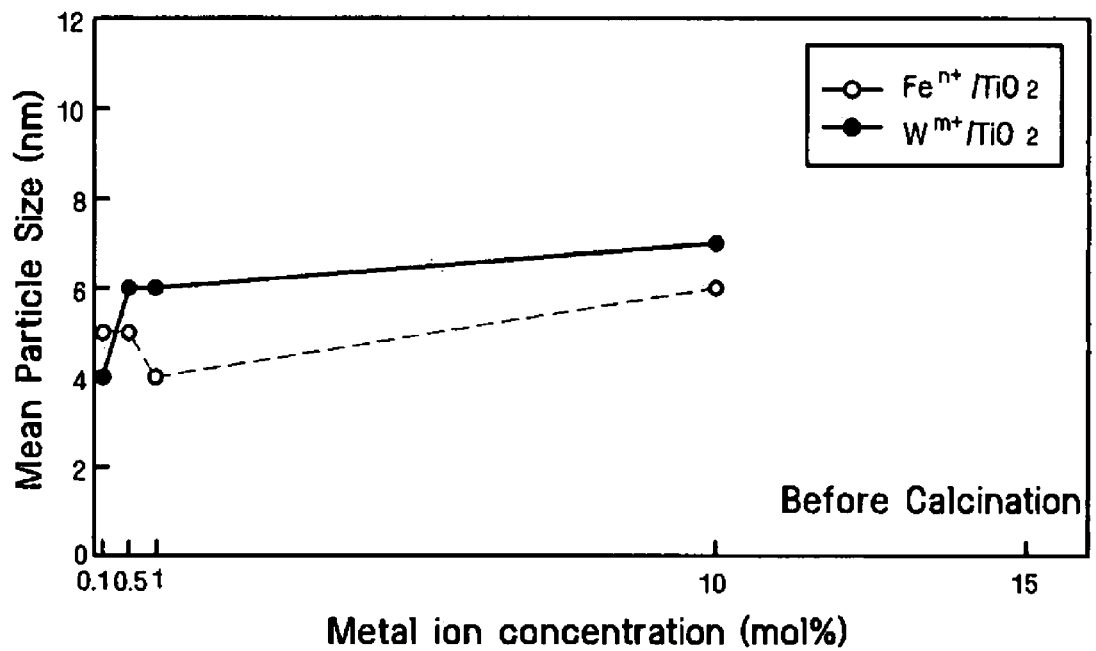
FIGS. 3A, 3B, 3C and 3D are graphs illustrating how mean particle size of the photocatalyst material varies in accordance with the concentration of the second-metal relative to the first-metal, before as well as after a calcination step (carried out at three different temperatures).
Figure 3B:
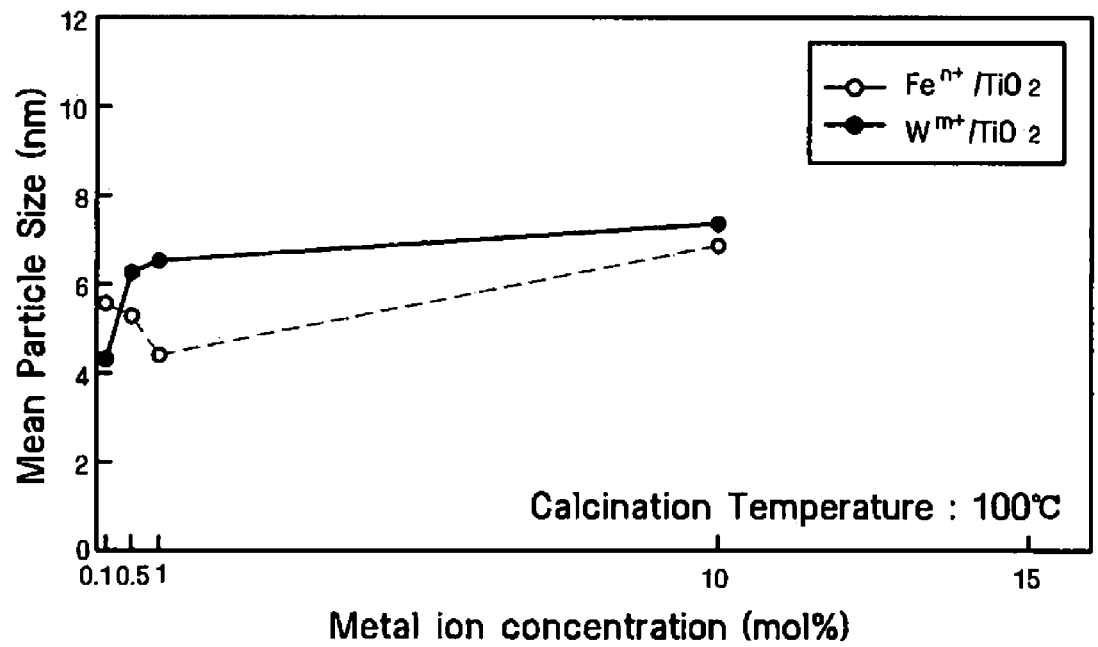
Figure 3C:
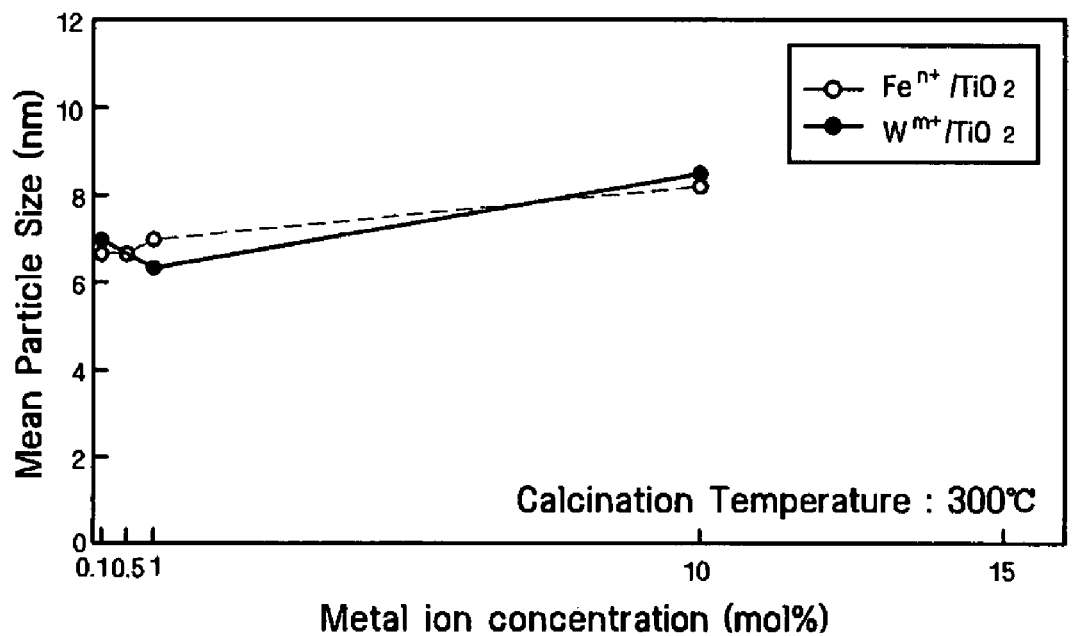
Figure 3D:
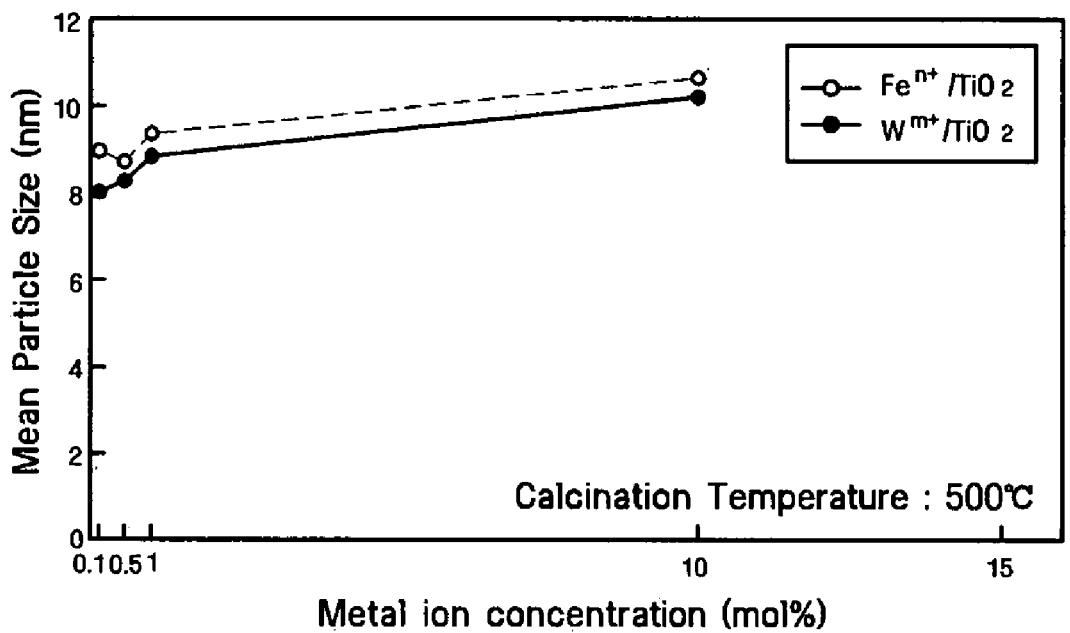

FIG. 3A shows the relationship between mean particle size and the second-metal ion concentration for the iron-doped and tungsten-doped titanium dioxide photocatalysts of Examples 1 and 2 "before calcination." FIG. 3A shows that, at each of the four tested mol % concentrations for both the iron-doped and tungsten-doped photocatalysts, the mean particle size was well below 10 nm. FIG. 3B shows similar results but with slightly higher mean particle sizes following calcination at 100° C. FIG. 3C also shows results generally similar to FIGS. 3A and 3B with calcination carried out at 300° C.; but in FIG. 3C, at a 10 mol % concentration of the second-metal, the mean particle sizes for both the iron-doped and the tungsten-doped photocatalysts are starting to approach 10 nm. FIG. 3D showing results for calcination at 500° C. shows that mean particle size at every mol % concentration is close to or, at 10 mol %, perhaps even slightly exceeds 10 nm.

Example 4

This example illustrates the relationship between absorption intensity and absorption wavelength for photocatalyst materials prepared according to Examples 1 and 2 above to see what material has the highest band gap energy and to compare this property for the photocatalysts of this invention with the band gap energy of undoped titanium dioxide. The equation for band gap energy (Eg) is $Eg = \hbar v$, where $v = c/\lambda$. Thus, $Eg = \hbar c/\lambda$. In this equation, $\lambda$ can be obtained from UV-vis spectrum, while $\hbar$ and c are known constants. Therefore, Eg can be calculated. An increase in band gap energy Eg leads to the inhibition of recombination, which can be improved by the photoactivation step. The results of the band gap energy experimental testing are illustrated in FIGS. 4A and 4B, as described below.

Figure 4A:
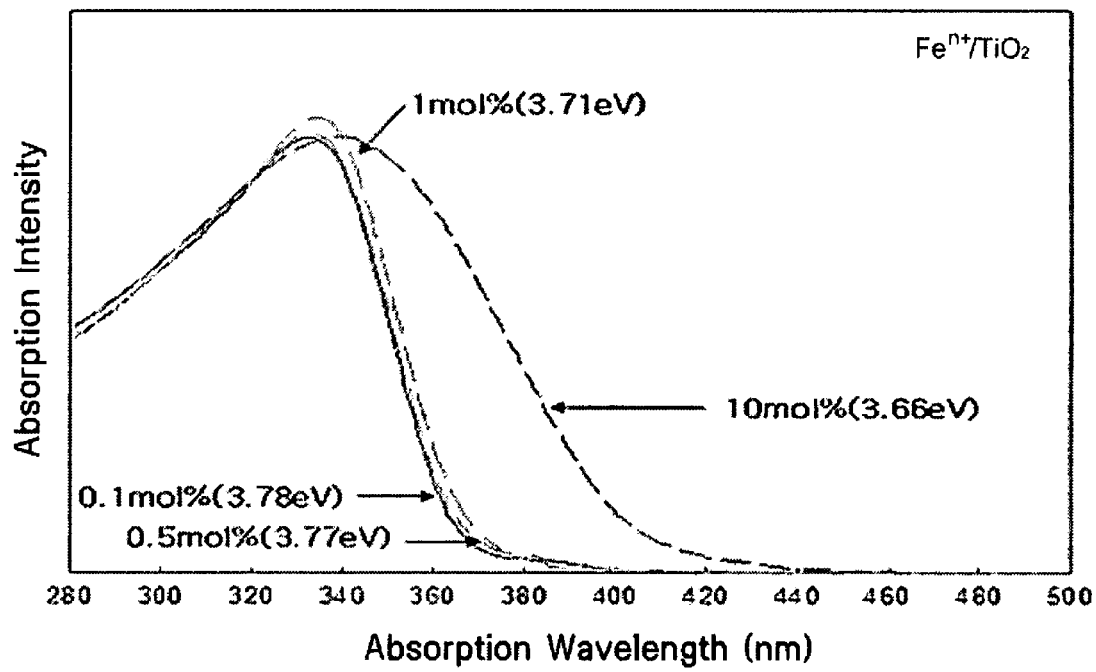
FIGS. 4A and 4B are graphs illustrating how light irradiation absorption intensity varies in accordance with the absorption wavelength for different photocatalyst materials prepared according to this invention.
Figure 4B:
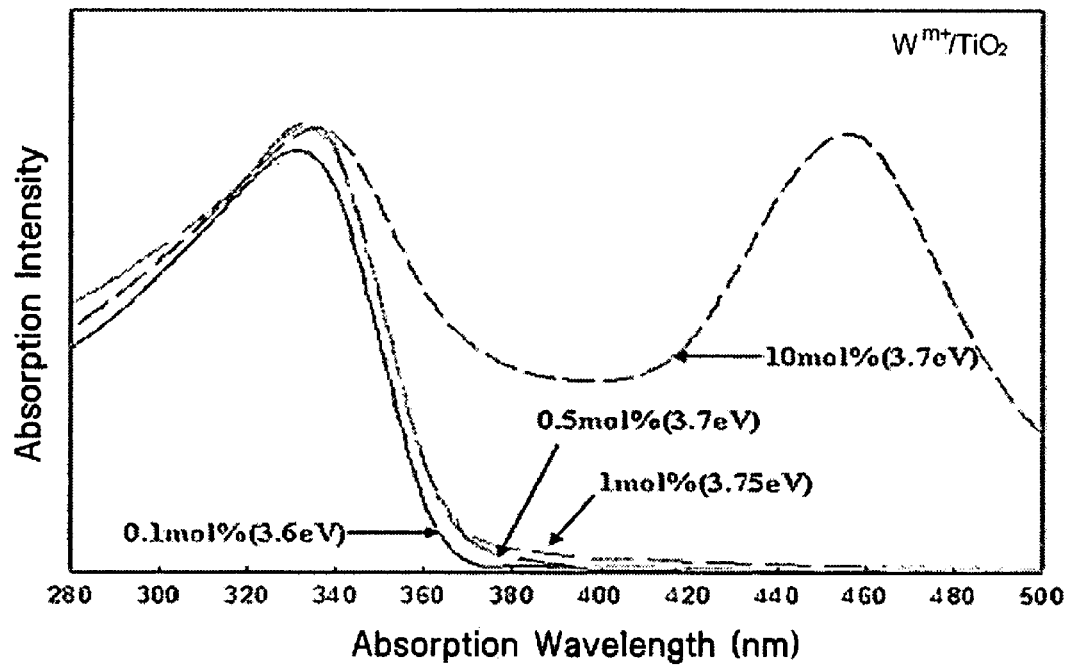

FIG. 4A is a graph that plots absorption intensity as a function of absorption wavelength for the iron-doped titanium oxide photocatalysts of Example 1 for each of the four mol % concentrations. This graph shows that the band gap for the iron-doped $TiO_2$ at every tested mol % concentration (ranging from a band gap energy of 3.78 eV to a band gap energy of 3.66 eV) is greater than that of undoped $TiO_2$ (which is 3.2 eV). FIG. 4B is a graph similar to FIG. 4A except that it shows testing of the tungsten-doped titanium dioxide photocatalyst of Example 2. Here again, the graph shows that the band gap for the tungsten-doped $TiO_2$ at every tested mol % concentration (ranging from a band gap energy of 3.75 eV to a band gap energy of 3.6 eV) is greater than that of undoped $TiO_2$ (namely 3.2 eV).

Example 5

This example illustrates the relationship between calcination temperature and the light activation response of the resulting photocatalyst owing principally to increased anatase crystallization growth at higher calcination temperatures up to 500° C. using the photocatalyst materials prepared according to Examples 1 and 2. The results of this experimental testing are illustrated in FIGS. 5A and 5B, as described below.

Figure 5A:
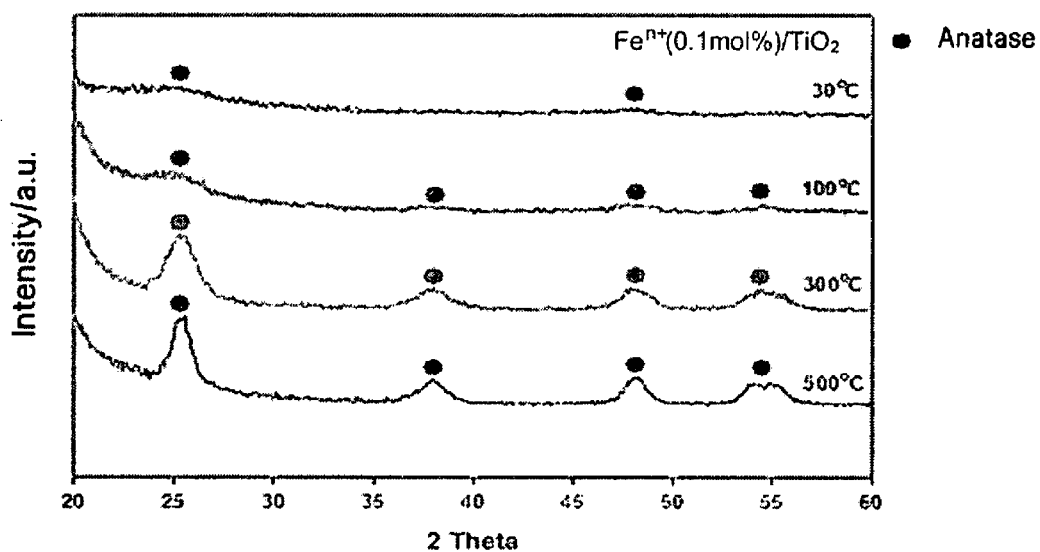
FIGS. 5A and 5B are graphs comparing the results of X-ray diffraction analysis of different photocatalyst materials prepared in accordance with this invention with a material produced by a calcination step carried out at a temperature below the temperature range of this invention.
Figure 5B:
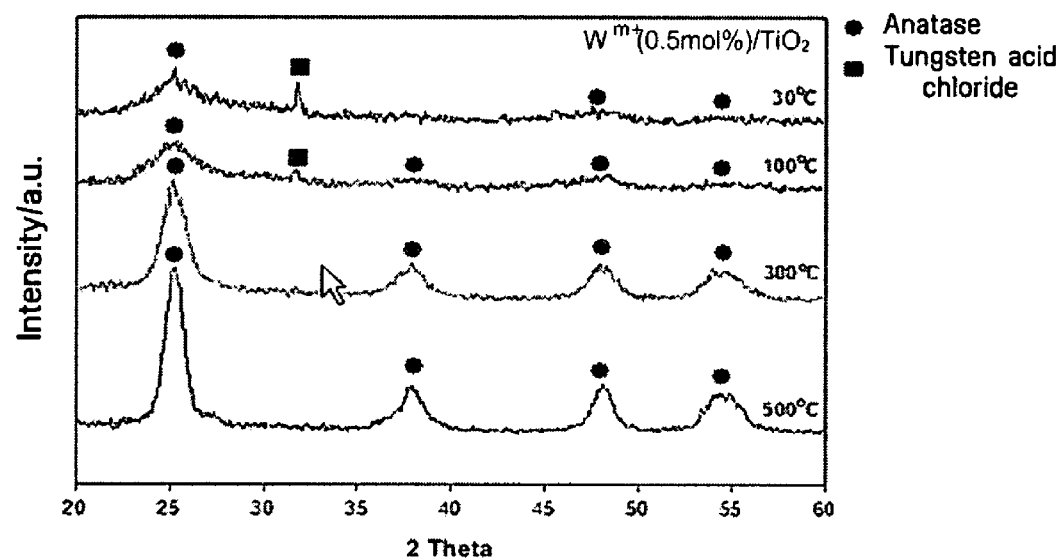

FIG. 5A is a graph showing the results of X-ray diffraction analysis for 0.1 mol % iron-doped titanium dioxide photocatalysts prepared according to Example 1 at calcination temperatures of 30° C., 100° C., 300° C. and 500° C. respectively. Correspondingly, FIG. 5B is a graph showing the results of X-ray diffraction analysis for 0.5 mol % tungsten-doped titanium dioxide photocatalysts prepared according to Example 2 at calcination temperatures of 30° C., 100° C., 300° C. and 500° C. respectively. These graphs illustrate that, as the calcination step temperature increases (up to about 500° C.), more anatase crystallization growth is induced, which is favorable to the light activation responsiveness of the completed photocatalyst material. In general, the order of photoactivity, as illustrated by this Example, can be summarized as follows: $TiO_2$ (anatase phase)>$TiO_2$ (Rutile phase) >ZnO>$ZrO_2$>$SnO_2$, etc.

For example, it has been confirmed with $TiO_2$ anatase phase calcined at 500° C. Calcination temperatures up to about 500° C. increase photoactivity. The X axes of the XRD patterns are 2 Theta (θ) which can be induced from Bragg's law, namely, $n\lambda=2d \sin \theta$. Therefore, $\sin \theta=n\lambda/(2d)$.

From the above equation, one can obtain the θ with n, λ and d from fixed value in XRD equipment. The Y axes of the XRD patterns are merely intensity which means the crystallinity.

Example 6

This example compares the efficiency of various photocatalysts prepared according to this invention with one another in decomposing toluene, a common and representative volatile organic contaminant, and it also compares the decomposition performance of photocatalysts prepared according to this invention with the performance of a commercially available photocatalyst known in the trade as P-25, manufactured by Degussa Co. The chemical composition of the commercial photocatalysts used herein are as follows:

P25: $TiO_2$ (Gas-phase oxidation method)
ST-01: $TiO_2$ (Sol-gel method).

Figure 6A:
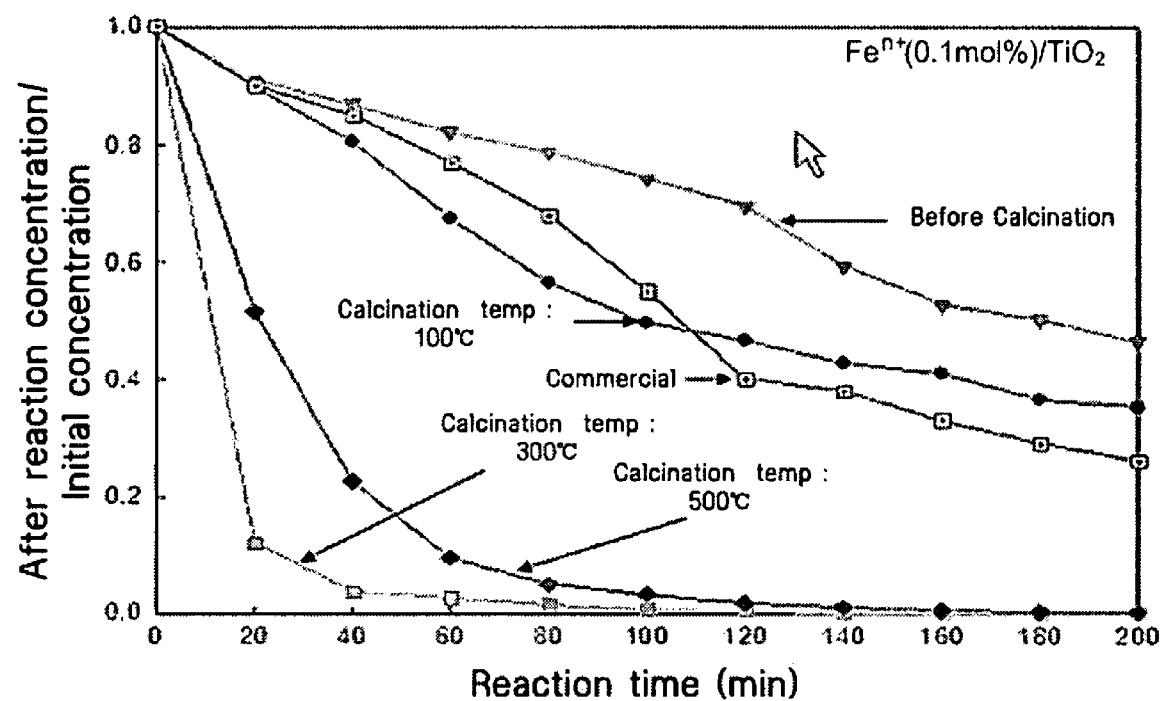
FIGS. 6A and 6B are graphs illustrating how the efficiency of photocatalyzed decomposition of volatile organic compounds using a photocatalyst of this invention varied with the calcination temperature used in preparing the photocatalyst.
Figure 6B:
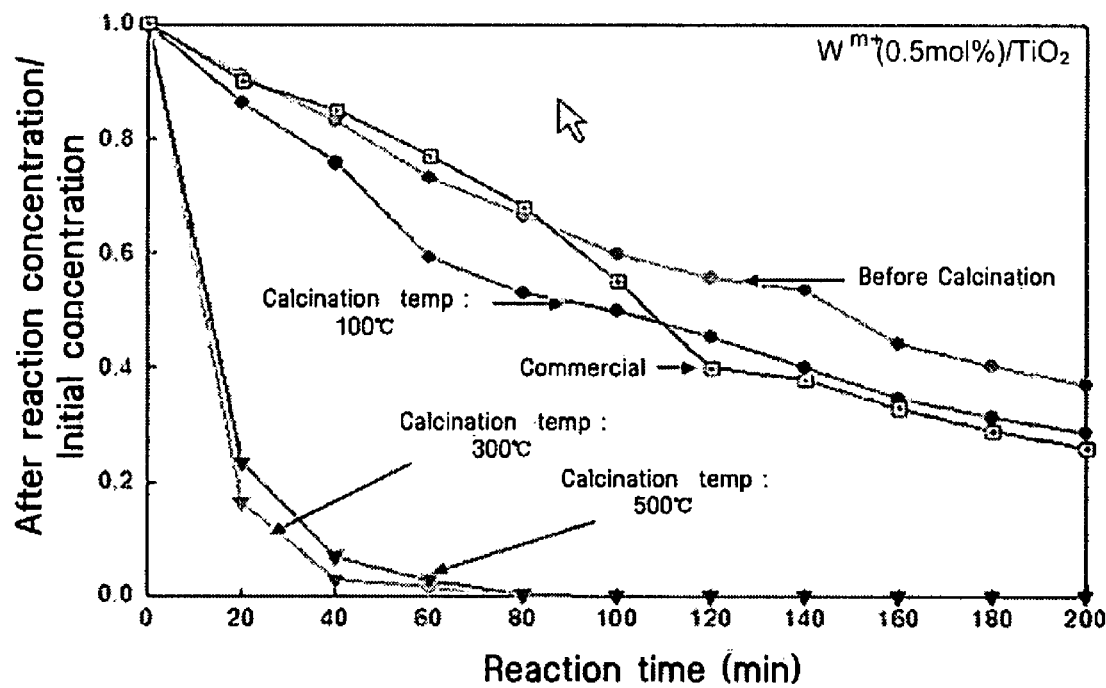

The results of this set of experimental tests are illustrated in FIGS. 6A and 6B.

Figure 2:
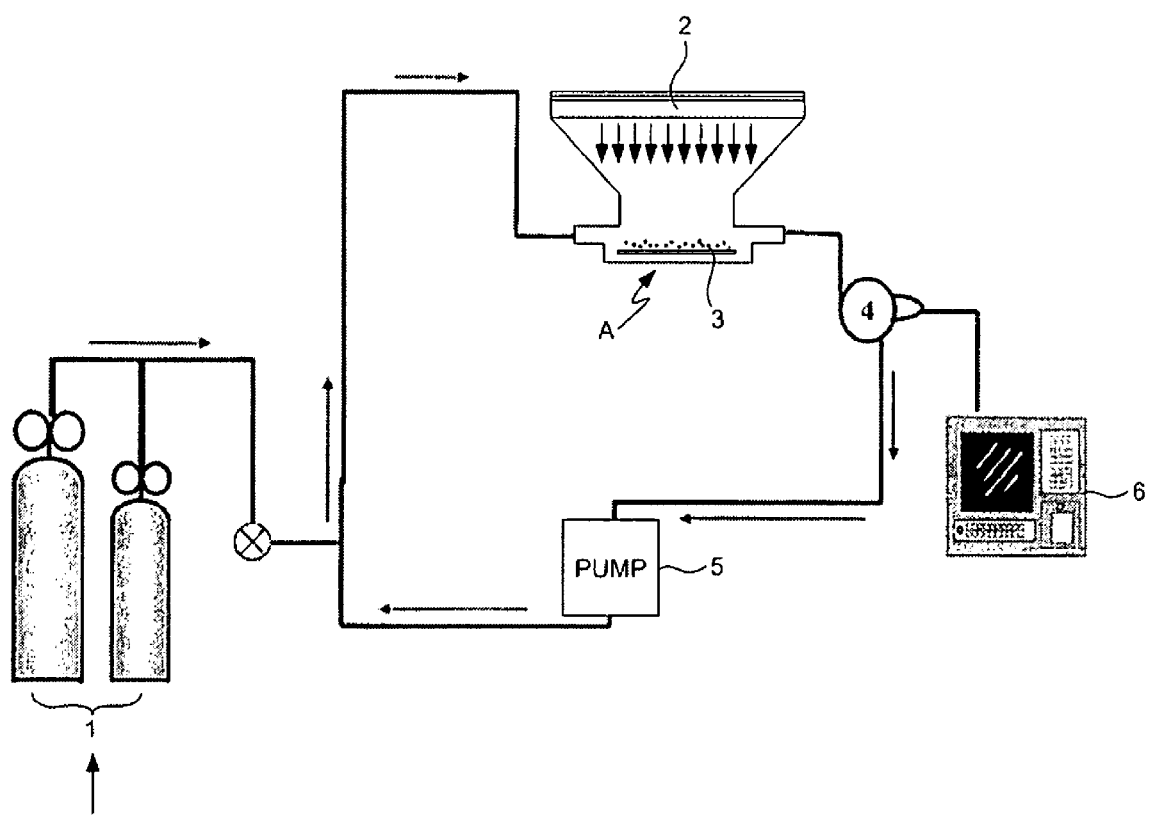
FIG. 2 is a schematic illustration of a laboratory line gas chromatography apparatus used to conduct experimental tests of photocatalyst materials prepared according to this invention.

In order to carry out this set of experimental tests, a laboratory line gas chromatography system as schematically shown in FIG. 2 was assembled. FIG. 2 shows a closed-loop air circulation system for continuously circulating a stream of air. A pump 5 is used to maintain flow of the air stream. An external supply 1 of the volatile organic contaminant (toluene) is connected by a supply line, which includes a valve element, to the closed-loop air circulation system so as to supply a controlled amount of the contaminant to the air stream at a location that is upstream from a contaminant decomposition unit in said closed-loop system.

The contaminant decomposition unit as shown in FIG. 2 comprises a UV lamp 2 to provide ultraviolet radiation to a reaction compartment through a UV-transparent window such as a quartz window. Inside the reaction compartment is a bed of photocatalyst 3 dispersed on a quartz plate A which is exposed to UV light when the lamp 2 is on. Downstream of the contaminant decomposition unit is a valve 4 by which a sample portion of the circulating air stream can be continuously or periodically withdrawn from the closed-loop system for testing using detector 6 to determine the effectiveness of the decomposition unit in removing the toluene contaminant.

For purposes of this set of experimental tests, a first photocatalyst was prepared according to this invention consisting essentially of $TiO_2$ doped with 0.1 mol % of Fe ions. One portion of this photocatalyst was left uncalcinated, while other portions were calcinated at 100° C., 300° C. and 500° C. A second photocatalyst was prepared according to this invention consisting essentially of $TiO_2$ doped with 0.5 mol % of W ions. One portion of this photocatalyst was left uncalcinated, while other portions were calcinated at 100° C., 300° C. and 500° C. 2 g of each prepared photocatalyst as well as a commercial photocatalyst was dispersed on separate quartz plates, each plate having a size of 2.5×7 $cm^2$, and each plate with photocatalyst was in turn installed in the reaction chamber of the system for testing. An air mixture containing 100 ppm of toluene was circulated through the photocatalyst being tested at a speed of 50 cc/min. The UV lamp produced UV light at a wavelength of 150 nm. The following testing parameters were used for this set of tests: reaction pressure=1 atm; reaction temperature=room temperature; reaction time=20 mins. Detector 6 was used to periodically monitor the toluene content of the air stream downstream of the reactor/photocatalyst bed over a period of 200 minutes from the starting time. The results of these tests are plotted in the graphs of FIGS. 6A and 6B.

FIG. 6A shows test results using the laboratory apparatus as illustrated in FIG. 2 with different photocatalysts for photocatalyst bed 3 of FIG. 2 as follows: (a) the commercial photocatalyst; (b) a 0.1 mol % iron-doped $TiO_2$ photocatalyst according to Example 1 before calcination; (c) a 0.1 mol % iron-doped $TiO_2$ photocatalyst according to Example 1 processed at a calcination temperature of 100° C.; (d) a 0.1 mol % iron-doped $TiO_2$ photocatalyst according to Example 1 processed at a calcination temperature of 300° C.; and (e) a 0.1 mol % iron-doped $TiO_2$ photocatalyst according to Example 1 processed at a calcination temperature of 500° C. In FIG. 6A, the y-axis shows the after reaction concentration of contaminant in the air stream (as measured by detector 6) divided by the initial concentration of contaminant in the air stream based on the amount/rate of contaminant addition (i.e., the after/before contaminant ratio). The x-axis of FIG. 6A is time measured from when the contaminant was added to the circulating air stream.

Thus, FIG. 6A shows how efficient the different photocatalysts tested are in decomposing the toluene contaminant. For example, FIG. 6A shows that the commercial photocatalyst (a) (plotted with open squares) performs as well as or better than the 0.1 mol % iron-doped $TiO_2$ photocatalyst (b) before calcination (plotted with solid triangles). Even after 200 minutes of reaction time, however, the commercial photocatalyst has only decomposed about 70% of the toluene contaminant in the air stream. The 0.1 mol % iron-doped $TiO_2$ photocatalyst of this invention that was subjected to calcination at 100° C. (c) (plotted with solid circles) performed significantly better than the "before calcination" photocatalyst (b), but performed about the same as the commercial photocatalyst.

By contrast, the photocatalysts according to this invention including calcination at 300° C. (d) (plotted with solid squares) and at 500° C. (e) (plotted with solid diamonds) performed substantially better than the others. Using either the (d) or (e) photocatalysts achieved substantially complete decomposition of the toluene contaminant after about 160 minutes. Furthermore, FIG. 6A shows that the (d) and (e) photocatalysts operate much more quickly than the other photocatalysts tested by decomposing at least half of the toluene contaminant in about 30 minutes or less, and decomposing 90% or more of the contaminant in 20 minutes (photocatalyst (d)) or 60 minutes (photocatalyst (e)). Photocatalyst (d) is seen to decompose the contaminant substantially faster than photocatalyst (e), which may reflect some of the adverse effects discussed above of carrying out the calcination step at a temperature as high as 500° C.

FIG. 6B is similar to FIG. 6A except that in FIG. 6B the commercial photocatalyst is compared with four tungsten-doped photocatalysts. Thus, FIG. 6B shows plots using: (a) the commercial photocatalyst; (b) a 0.5 mol % tungsten-doped $TiO_2$ photocatalyst according to Example 2 before calcination; (c) a 0.5 mol % tungsten-doped $TiO_2$ photocatalyst according to Example 2 processed at a calcination temperature of 100° C.; (d) a 0.5 mol % tungsten-doped $TiO_2$ photocatalyst according to Example 2 processed at a calcination temperature of 300° C.; and (e) a 0.5 mol % tungsten-doped $TiO_2$ photocatalyst according to Example 2 processed at a calcination temperature of 500° C.

Although the results shown in FIG. 6B are generally consistent with those of FIG. 6A, the most significant difference is that the performance characteristics of the (d) and (e) photocatalysts hardly differ at all, and both of these photocatalysts perform dramatically better than either the commercial photocatalyst (a) or the tungsten-doped photocatalysts either before calcination (b) or processed at a calcination temperature of 100° C. These experimental results confirm both the importance of the calcination step and the need to carefully control the calcination temperature to obtain optimum performance characteristics. Based on the teachings of this application, one skilled in this art could readily determine an optimum calcination temperature for a particular combination of first-metal oxide, a second-metal dopant, and a given mol % of the second-metal.

Example 7

Figure 7:
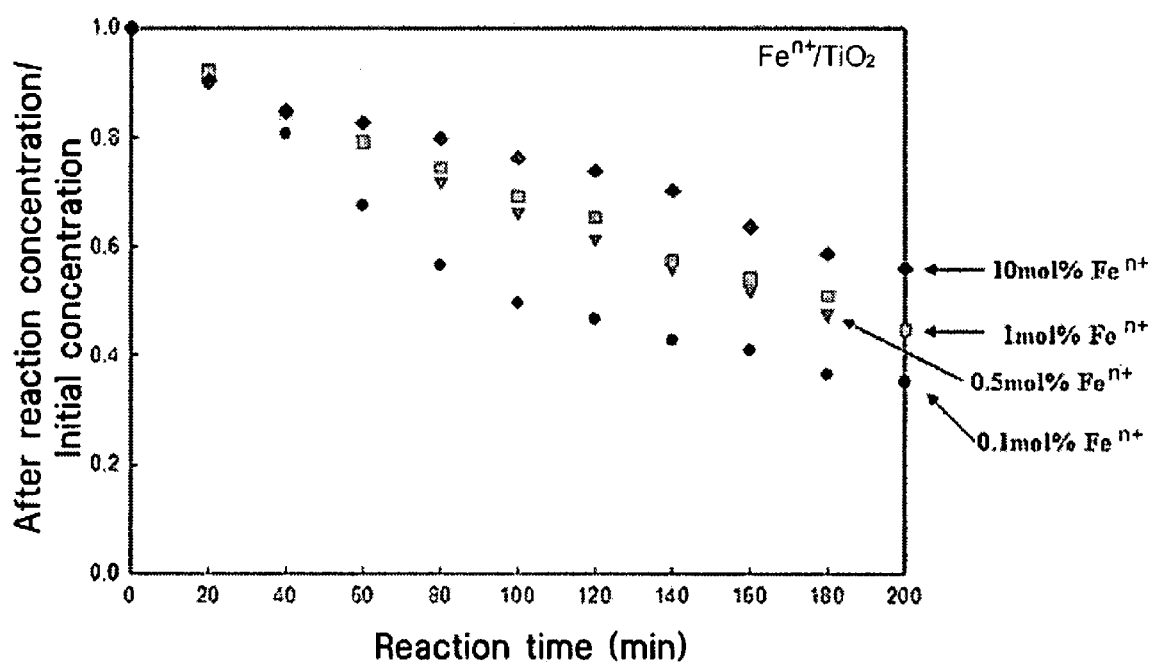
FIG. 7 is a graph illustrating how the efficiency of photocatalyzed decomposition of volatile organic compounds using a photocatalyst of this invention varies with the relative molar proportion of the second-metal to the first-metal in the photocatalyst.

This Example and accompanying FIG. 7 illustrate the loading effect of dopants. The photocatalysts tested in this Example were prepared by a process in accordance with the present invention with calcination carried out at 100° C. Photoactivity of the photocatalyst is seen to be enhanced at low concentration of dopant due to dispersion of the dopant throughout the lattice of $TiO_2$. However, at heavy concentrations of dopant, photoactivity is seen to decrease. This effect is theorized to be caused by the formation of clusters which play a role of facilitating recombination or by interfering with light to the $TiO_2$.

The preceding examples confirm that doping a first-metal oxide with a relatively small proportion of ions of a second-metal according to the preparation method of this invention produces an efficient and effective photocatalyst material having a very small particle size, a relatively high band gap energy, and a high capability of decomposing volatile organic contaminants by photocatalyzed oxidation. With lower calcination temperatures, particle sizes will be smaller, but higher calcination temperatures (at least up to about 500° C.) promote anatase crystallization growth that is favorable to enhancing light activation responsiveness of the photocatalyst. On the other hand, certain negative performance effects from calcinating at the high end of the acceptable temperature range may lead one to try to optimize the photocatalyst manufacturing method by selecting an intermediate calcination temperature, for example about 300° C.

In general, however, the examples show that effective photocatalysts in accordance with this invention may be produced by doping a first-metal oxide with about 0.1 to 10 mol % of a second-metal ion, and by performing a calcination step at a temperature of about 50° C. to 600° C., preferably a temperature of about 100° C. to 500° C., more preferably about 300° C. to 500° C.

Figure 8:
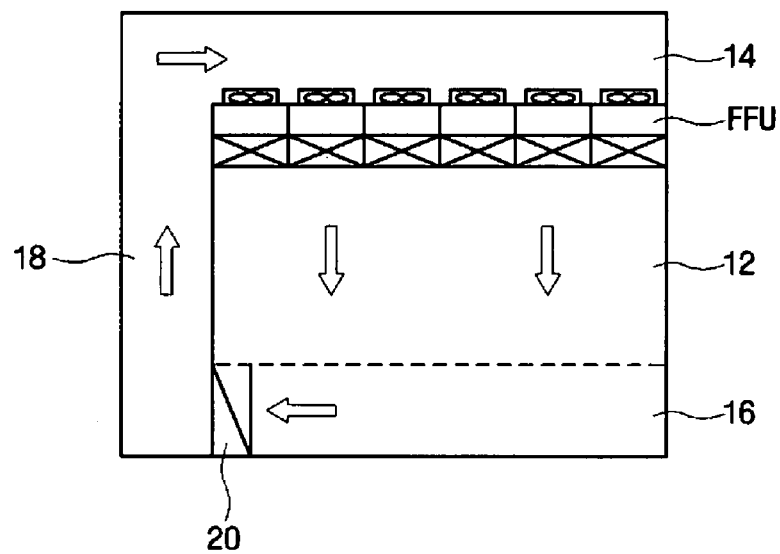
FIG. 8 is a schematic illustration of one embodiment of an air purification apparatus incorporating an array of fan filter units, each according to this invention and utilizing a photocatalyst according to this invention.
Figure 9A:
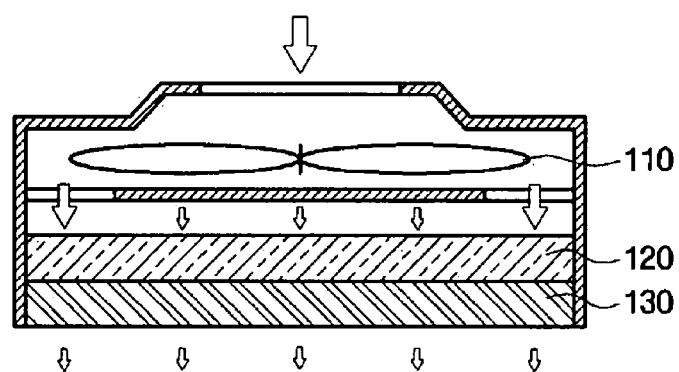
FIGS. 9A, 9B, 9C and 9D are schematic cross-sectional illustrations of alternative embodiments of a single fan filter unit according to this invention, each utilizing a photocatalyst according to this invention.
Figure 9B:
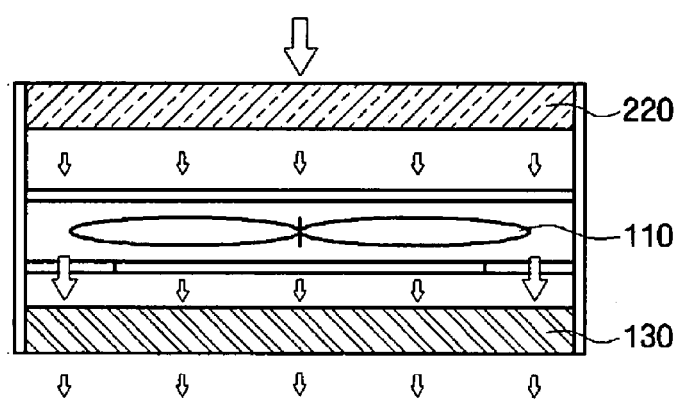
Figure 9C:
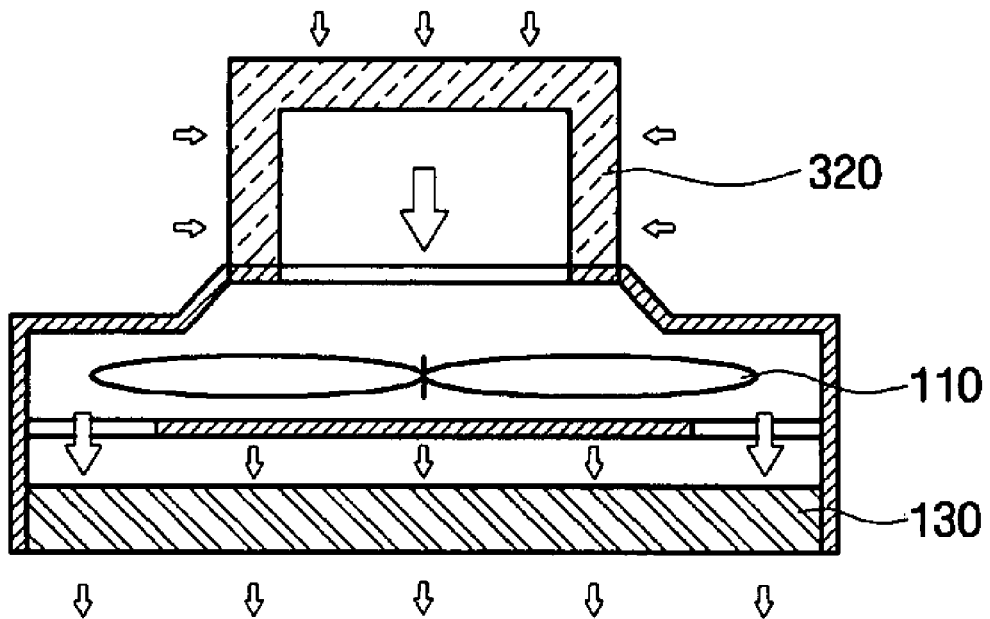
Figure 9D:
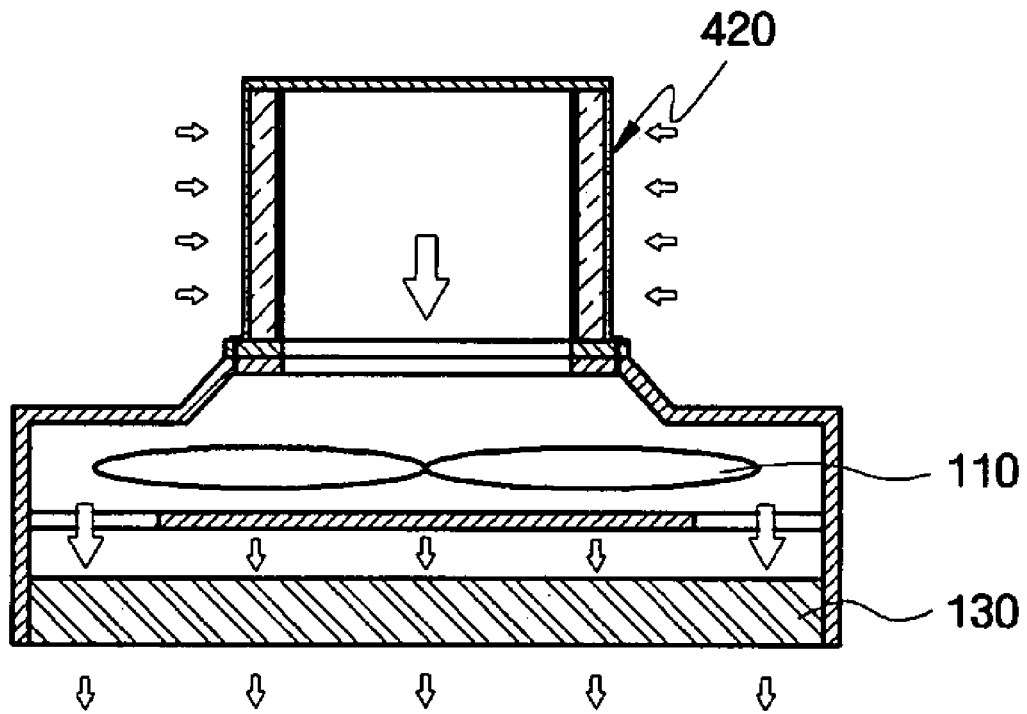

FIG. 8 schematically illustrates a "clean" room that utilizes a photocatalyst in accordance with this invention to purify a closed-loop circulating air stream by removing contaminants prior to recirculating the air stream. Such closed-loop air recirculation clean room environments are commonplace in industrial applications where it is necessary to maintain a workplace substantially free of any contamination and/or where environmentally unacceptable byproducts are produced as part of the industrial operation. The manufacture of modern semiconductor devices is a good example of a workplace that necessitates a clean room environment. Because of their widespread use as solvents, cleaning agents, and reagents in industrial applications, volatile organic compounds are a common contaminant in the recirculating air stream of a clean room. The photocatalysts of this invention have special utility in such clean room applications.

Thus, FIG. 8 schematically shows a clean room 12 suitable to semiconductor manufacturing including a ceiling region 14, an under floor region 16 and a cooling coil 20. The sidewalls, ceiling and floor of clean room 12 define an air circulation path 18. At some point along air circulation path 18, for example in ceiling region 14, is located an array of fan filter units through which the air stream must pass. The fan filter units are designed to treat the circulating air stream as it passes through the units so as to supply a fresh stream of purified air to the clean room.

In one application of the present invention, each fan filter unit in an array of such units includes a volatile organic contaminant decomposition system comprising a bed of photocatalyst according to this invention in combination with a light source suitable for activating the photocatalyst. A variety of fan filter unit configurations as illustrated in FIGS. 9A to 9D can readily be adapted for use in combination with the photocatalysts of this invention. The fan filter unit configurations of FIGS. 9A to 9D are disclosed and discussed in greater detail in Korean laid open application on 2005-75927, which is hereby incorporated herein by reference.

Each of the fan filter configurations of FIGS. 9A to 9D includes a housing that houses a fan 110, a particle filter 130, and a chemical filter element 120, 220, 320 and 420, respectively, in FIGS. 9A to 9D. During operation, an air stream, possibly containing volatile organic compounds, ammonia, ozone, and perhaps other contaminants, is drawn by the fan elements 110 into the fan filter housings. The volatile organic compounds, ammonia, and ozone, if present, are chemically dissolved or decomposed by the chemical filter elements. Particulates are then removed by the particle filter elements 130, and fresh, purified air is supplied to the clean room.

In an embodiment of the present invention, chemical filter elements 120, 220, 320 and 420 respectively in FIGS. 9A to 9D comprise a volatile organic contaminant decomposition system incorporating a photocatalyst material according to the present invention. Such chemical filter elements may be formed by coating the photocatalyst material of this invention on a surface of a suitably sized and shaped support member fashioned of a certain or comparable material. For example, the support member may be selected from glass, silica gel, silica alumina, zeolite, a honeycomb monolith substrate made of metal, or a ball and a coil type of molecular structure.

Additionally, a chemical filter element in accordance with this invention comprises a source of light energy, for example a UV lamp, positioned near and oriented toward the photocatalyst-coated surface of the support member so as to activate the photocatalyst. The photocatalyst of the present invention may also or alternatively be coated in predetermined regions on interior and/or exterior walls of the clean room system where it will be light-activated and come into contact with the air stream.

Embodiments of the present invention include applications in antibiotic manufacturing, semiconductor fabrication, and other industrial applications where a "clean" room environment is necessary or at least desirable. The photocatalyst materials of the present invention are relatively inexpensive to manufacture, especially in comparison with prior art photocatalysts employing noble (precious) metals as the dopant. The methods for manufacturing the photocatalysts of this invention are relatively simple—comprising a mixing step, a dialysis step, a drying step, and a calcinations step—and do not require expensive, specially-designed equipment. In addition, only a single cycle of the method is required to produce a finished, ready-to-use photocatalyst product. The preparation methods of this invention also use low temperature synthesis and low temperature vacuum drying, which also contribute to a low-cost photocatalyst product.

The photocatalyst materials produced according to the methods of this invention have a number of advantageous physical and chemical properties. The photocatalysts of this invention demonstrate band gap widening properties and slower recombination speeds, which leads to elevated photocatalytic activity and enhancement of oxidation capability. The photocatalysts of this invention also have the benefit of being produced as nano-sized particles which present a greater surface area for contacting an air stream, which thereby further enhances the effectiveness of these materials in decomposing volatile organic compounds.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and should not be restricted or limited by the foregoing detailed description.

Having described the invention, what is claimed is:

1. A method for preparing a photocatalyst material comprising the sequential steps of:
   (a) forming a mixture of a first-metal precursor and a second-metal precursor in a predetermined molar ratio of said second-metal relative to said first-metal, wherein said first-metal is a metal that exhibits photo-induced semiconductor properties and said second-metal is a dopant selected from the group consisting of tungsten (W), vanadium (V), and alloys and combinations thereof;
   (b) dialyzing the mixture of first-metal precursor and second-metal precursor to remove nonessential ion(s) from the mixture thereby to form a preliminary product comprising an oxide of the first-metal having ions of the second-metal dispersed therethrough;
   (c) drying the preliminary product to form a dried first-metal oxide product doped with ions of said second-metal, said dried product comprising very small particles; and,
   (d) calcinating the dried first-metal oxide product by applying heat to form the photocatalyst material.

2. A method according to claim 1 wherein the photocatalyst material is formed of very small particles having a mean particle diameter of about 10 nm or less.

3. A method according to claim 1 wherein: (a) said first-metal precursor has the general chemical formula $M^1_xCl_y$, where $M^1$ is a metal that exhibits photo-induced semiconductor properties, Cl is chloride ion, and x and y are positive integers; and also (b) said second-metal precursor has the general chemical formula $M^2_xCl_y$, where $M^2$ is the second-metal, Cl is chloride ion, and x and y are positive integers.

4. A method according to claim 3 wherein $M^1$ is selected from the group consisting of titanium (Ti), zirconium (Zr), tin (Sn), zinc (Zn), and alloys and combinations thereof.

5. A method according to claim 1 wherein said first-metal precursor is selected from the group consisting of $TiCl_4$, $ZrCl_2$, $SnCl_4$, $ZnCl_2$ and mixtures thereof, and also said second-metal precursor is selected from the group consisting of $W_xCl_y$, $V_xCl_y$ and mixtures thereof, where x and y are positive integers.

6. A method according to claim 1 wherein step (a) comprises the substeps of: forming a solution of said second-metal precursor in a suitable solvent; adding the first-metal precursor to the solution of second-metal precursor; and, mixing the solution to form a substantially homogeneous mixture of the first-metal and second-metal precursors.

7. A method according to claim 6 wherein said second-metal precursor is selected from the group consisting of $W_xCl_y$, $V_xCl_y$ and mixtures thereof, where x and y are positive integers, and also wherein said solvent is selected from the group consisting of water, hydrochloric acid, acetone, ether and ethanol.

8. A method according to claim 6 wherein the step of forming a solution of the second-metal precursor in a solvent is carried out at a temperature of about 0° C. to about 1° C.

9. A method according to claim 6 wherein the molar concentration of the second-metal in the solution of said second-metal precursor is in the range of about 0.1-10 mol %.

10. A method according to claim 1 wherein step (b) removes chloride ions from the mixture of first-metal precursor and second-metal precursor.

11. A method according to claim 1 wherein step (b) comprises the substeps of: placing the mixture of first-metal precursor and second-metal precursor in a container comprising a semi-permeable membrane that is permeable to chloride ions but is not permeable to the first-metal or the second-metal; floating the container with the precursor mixture in a fresh water bath for a sufficient length of time substantially to remove the chloride ions from the mixture; and, recovering the preliminary product from the container.

12. A method according to claim 11 wherein the container is floated in the water bath for at least about one hour.

13. A method according to claim 11 wherein the water bath is at a temperature of about room temperature.

14. A method according to claim 1 wherein step (c) is a vacuum drying step carried out at about room temperature and at a pressure of about $10^{-3}$ torr to about $10^{-4}$ torr.

15. A method according to claim 1 wherein step (d) is carried out at a temperature in the range of about 50° C. to about 600° C.

16. A method according to claim 1 wherein step (d) is carried out at a temperature in the range of about 100° C. to about 500° C.

17. A method according to claim 1 wherein step (d) is carried out at a temperature in the range of about 300° C. to about 500° C.

18. A method according to claim 1 wherein step (d) is carried out for a period of about 1 to 3 hours.

19. A method according to claim 1 wherein step (d) is carried out at a temperature and for a length of time that is sufficient significantly to enhance the effectiveness of the photocatalyst in decomposing volatile organic compounds relative to the effectiveness of the product of step (c) prior to any calcination.

* * * * *